US006206085B1

United States Patent
Correa (10) Patent No.: US 6,206,085 B1
(45) Date of Patent: Mar. 27, 2001

(54) MOUNTING OF A HEAT EXCHANGER IN AN AIR CONDITIONER

(75) Inventor: Juan Carlos Carne Correa, Porto Alegre (BR)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/485,553

(22) PCT Filed: Jun. 22, 1998

(86) PCT No.: PCT/BR98/00042

§ 371 Date: Feb. 14, 2000

§ 102(e) Date: Feb. 14, 2000

(87) PCT Pub. No.: WO99/67583

PCT Pub. Date: Dec. 29, 1999

(51) Int. Cl.⁷ .................................. F24F 13/30; F28F 9/00
(52) U.S. Cl. ............................ 165/67; 165/122; 165/149; 403/316; 403/353; 403/362
(58) Field of Search ..................... 403/316, 353, 403/362, 331, 381; 165/67, 78, 149, 150, 122

(56) References Cited

U.S. PATENT DOCUMENTS

| 2,354,131 | * | 7/1944 | Larkin ................................. 165/149 |
| 4,102,148 | * | 7/1978 | Matthews et al. ........................ 62/77 |
| 4,165,944 | * | 8/1979 | Sunasky ................................. 403/254 |
| 4,367,979 | * | 1/1983 | Milligan ................................. 405/70 |
| 4,406,132 | * | 9/1983 | Bolton et al. ........................... 62/77 |
| 4,802,716 | * | 2/1989 | Rock et al. ........................ 312/330 R |
| 5,613,554 | * | 3/1997 | Bull et al. ............................. 165/150 |

FOREIGN PATENT DOCUMENTS 59-004387 * 1/1984 (JP) .
5-113228 * 5/1993 (JP) .

* cited by examiner

Primary Examiner—Allen Flanigan (57) ABSTRACT

The combination of a heat exchanger and support structure for the heat exchanger. The heat exchanger includes a first tube sheet having a planar mounting flange which has at least one opening formed therein. The opening defines an edge facing in a predetermined direction. A second tube sheet has a second planar mounting flange which also has at least one opening formed therein, which defines an edge facing in the same predetermined direction. The two tube sheets are spaced from one another with the first and second mounting flanges lying in substantially the same plane. The support structure includes a first planar support surface adapted to receive the flange of the first tube sheet in parallel confronting relationship. The support surface has integrally formed therein an upstanding structural protrusion, which includes a root section and an upper enlarged section, which is configured to pass through the openings in the first flange. The root section and the enlarged section define, together with the planar support surface, a narrow slot configured to receive the edge of the first tube sheets mounting flange therein. A second planar support surface of the support structure is configured the same as the first planar support surface and is adapted to cooperate with the second tube in a like manner. The first tube sheet is provided with a structural portion extending perpendicularly from the first mounting flange. The perpendicular structural portion is spaced from the edge and has an opening formed therein. The upper enlarged section of the structural protrusion of the first support surface is provided with a portion thereof in spaced relation with the perpendicular section of the first tube sheet. The spaced portion has an opening therein in axial alignment with the opening in the perpendicular section. A threaded fastener passes through the opening in the spaced portion and into threaded engagement with the opening in the perpendicular section. As a result, when the first and second tube sheets are positioned with their edges in confronting relation with their mating slots, and the threaded fastener is actuated to engage the perpendicular section, the edges are drawn into engagement with their mating slots to thereby attach the heat exchanger to the first and second support surfaces.

4 Claims, 7 Drawing Sheets

MOUNTING OF A HEAT EXCHANGER IN AN AIR CONDITIONER

TECHNICAL FIELD

The invention generally relates to air distribution units of the type commonly used in air conditioning, heating or ventilation systems and, more particularly, to a method of mounting a heat exchange coil in such a unit.

BACKGROUND ART

In many commercial air conditioning, heating and ventilating systems, treated air is discharged into an area to be conditioned through an air distribution or conditioning unit. For example, one type of air conditioning system, often referred to as a split system, includes separate indoor and outdoor units. The outdoor unit includes a compressor, a heat exchanger and a fan. The indoor unit includes a heat exchanger and a fan. In operation, the indoor fan draws air into the indoor unit, through an inlet thereof, and forces the air over the indoor heat exchanger and then out of the indoor unit, through an outlet opening therein.

The outdoor fan draws air into the outdoor unit, through an inlet, forces that air over the outdoor heat exchanger and then forces that air out of the outdoor unit through an outlet therein. At the same time, a compressor causes a refrigeration fluid to circulate through and between the indoor/outdoor heat exchangers. At the indoor heat exchanger, the refrigerant absorbs heat from the air passing over that heat exchanger, cooling that air. At the same time, at the outdoor heat exchanger, the air passing over the heat exchanger absorbs heat from the refrigerant passing therethrough.

In manufacturing the indoor units of such air conditioning systems, the mounting of the indoor fans, heat exchanger, and related components typically require a number of fasteners of different types. As a result, the labor involved in assembly of such units has been high in view of the large number of fasteners required. It is considered extremely desirable to minimize the number of components required in order to fabricate the indoor units of such an air conditioning system.

DISCLOSURE OF THE INVENTION

The combination of a heat exchanger and support structure for the heat exchanger. The heat exchanger includes a first tube sheet having a planar mounting flange which has at least one opening formed therein. The opening defines an edge facing in a predetermined direction. A second tube sheet has a second planar mounting flange which also has at least one opening formed therein, which defines an edge facing in the same predetermined direction. The two tube sheets are spaced from one another with the first and second mounting flanges lying in substantially the same plane. The support structure includes a first planar support surface adapted to receive the flange of the first tube sheet in parallel confronting relationship. The support surface has integrally formed therein an upstanding structural protrusion, which includes a root section and an upper enlarged section, which is configured to pass through the openings in the first flange. The root section and the enlarged section define, together with the planar support surface, a narrow slot configured to receive the edge of the first tube sheets mounting flange therein. A second planar support surface of the support structure is configured the same as the first planar support surface and is adapted to cooperate with the second tube in a like manner. The first tube sheet is provided with a structural portion extending perpendicularly from the first mounting flange. The perpendicular structural portion is spaced from the edge and has an opening formed therein. The upper enlarged section of the structural protrusion of the first support surface is provided with a portion thereof in spaced relation with the perpendicular section of the first tube sheet. The spaced portion has an opening therein in axial alignment with the opening in the perpendicular section. A threaded fastener passes through the opening in the spaced portion and into threaded engagement with the opening in the perpendicular section. As a result, when the first and second tube sheets are positioned with their edges in confronting relation with their mating slots, and the threaded fastener is actuated to engage the perpendicular section, the edges are drawn into engagement with their mating slots to thereby attach the heat exchanger to the first and second support surfaces.

BRIEF DESCRIPTION OF THE DRAWINGS

The invention may be better understood and its objects and advantages will become apparent to those skilled in the art by reference to the accompanying drawings, in which.

BEST MODE FOR CARRYING OUT THE INVENTION AND INDUSTRIAL APPLICABILITY

Figure 1:
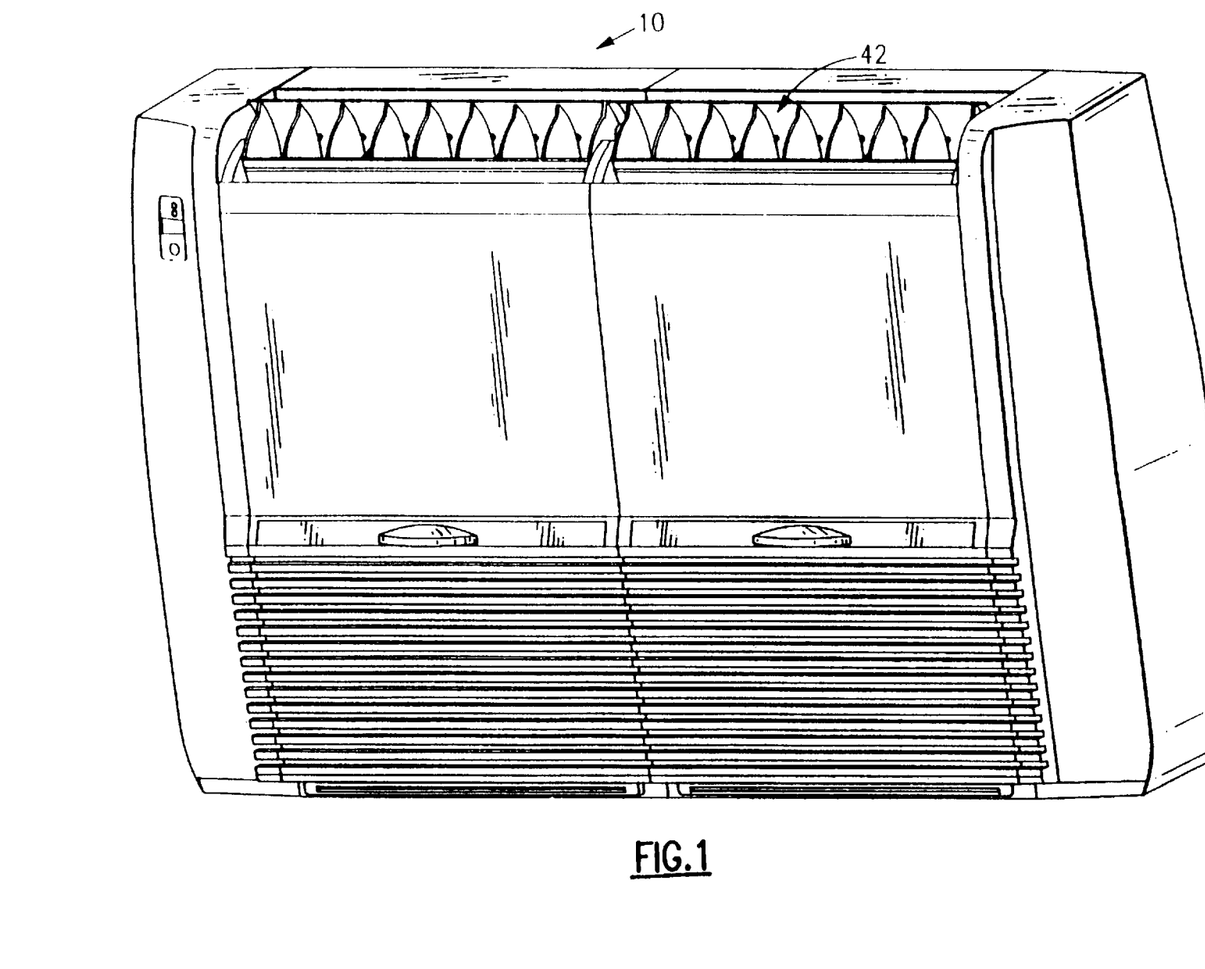
FIG. 1 is a perspective view of the indoor unit of an air conditioner, which embodies the features of the present invention.
Figure 7:
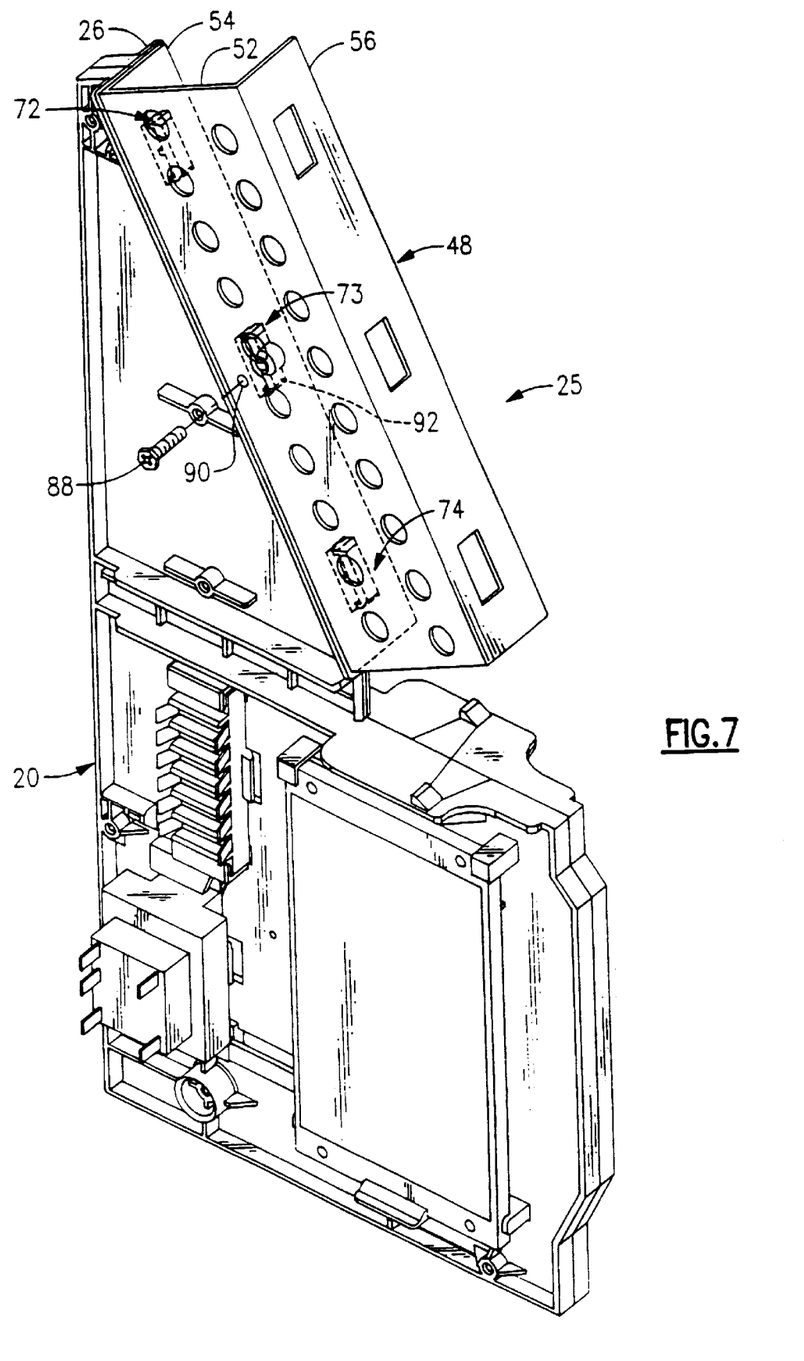
FIG. 7 is a simplified left end perspective showing an optional attachment feature.

Looking first at FIGS. 1 and 7, the indoor unit 10 of a split system air conditioning system of the type incorporating a heat exchanger mounting according to the present invention is illustrated. Briefly, the unit 10 includes a main structural support frame 12, which includes a bottom panel 14, a back panel 16 and a top section 18. Attached to the sides of the back and top panels are structural internal side covers 20. The side covers 20 and the back panel 16 cooperate to support a horizontally extending fan support panel 22, which includes a pair of rectangular openings 24 formed therein. Mounted above the fan support panel 22 on a pair of inclined surfaces 26, defined by the internal side covers 20 is a heat exchanger coil 25.

Mounted under the top section of the main support frame 12 is an upper condensate collection pan 28. Mounted in the front of the unit, under the bottom of the heat exchanger 25, and supported by the front edge 30 of the fan support panel 22, is a lower condensate collection pan 32. A front section of the lower condensate collection pan extends upwardly and is spaced from the heat exchanger coil 25.

Mounted to the lower surface of the fan support panel 22 is a fan assembly 34, which includes an electric motor 36 adapted to drive a pair of centrifugal fans 38, which are each enclosed in a two-piece scroll housing 40. Each of scroll housings 40 defines a rectangular upper air outlet opening 39, which is in air flow communication with the rectangular openings 24 in the fan support panel 22.

As a result of the above-described arrangement of components, when the fan assembly is energized, air is drawn into the region 41 underlying the fan support panel 22 through the open front. The air is then directed upwardly through the rectangular openings 24, through the heat exchanger coil 25 and is discharged through an opening 42 defined by the upper edge 44 of the lower condensate pan 32 and the front edge 46 of the upper condensate pan 28.

The heat exchanger 25 is of the cross flow type and includes a left-hand tube sheet 48 and a right-hand tube sheet 50, both of which are basically formed from an elongated U-shaped channel. The left-hand tube sheet comprises a planar center section 52 interconnected to a back flange 54 and front flange 56, both extending substantially perpendicular to the planar center section 52 and to the right, as viewed in the drawing figures.

The right-hand tube sheet, likewise, comprises a planar center section 58 and a back flange 60 and a front flange 62, extending to the right in a similar orientation to those on the left-hand tube sheet. The back flanges 54 and 60 of each of the tube sheets are each provided with three rectangular openings all generally bearing the reference numeral 64. The opening 64 will be referred to at different times as the upper, center and lower openings of the respective tube sheet and back flange in which they are found.

The heat exchanger further includes a plurality of refrigerant tubes 66 extending between the tube sheets 48 and 50. The tubes 66 are interconnected by a plurality of hairpin turns 68, as is conventional, to define the refrigerant circuit through the heat exchanger. A plurality of vertically extending heat exchange fins 70 are carried by the tubes and are oriented substantially parallel to the planar center sections 52 and 58 of the tube sheets.

Figure 2:
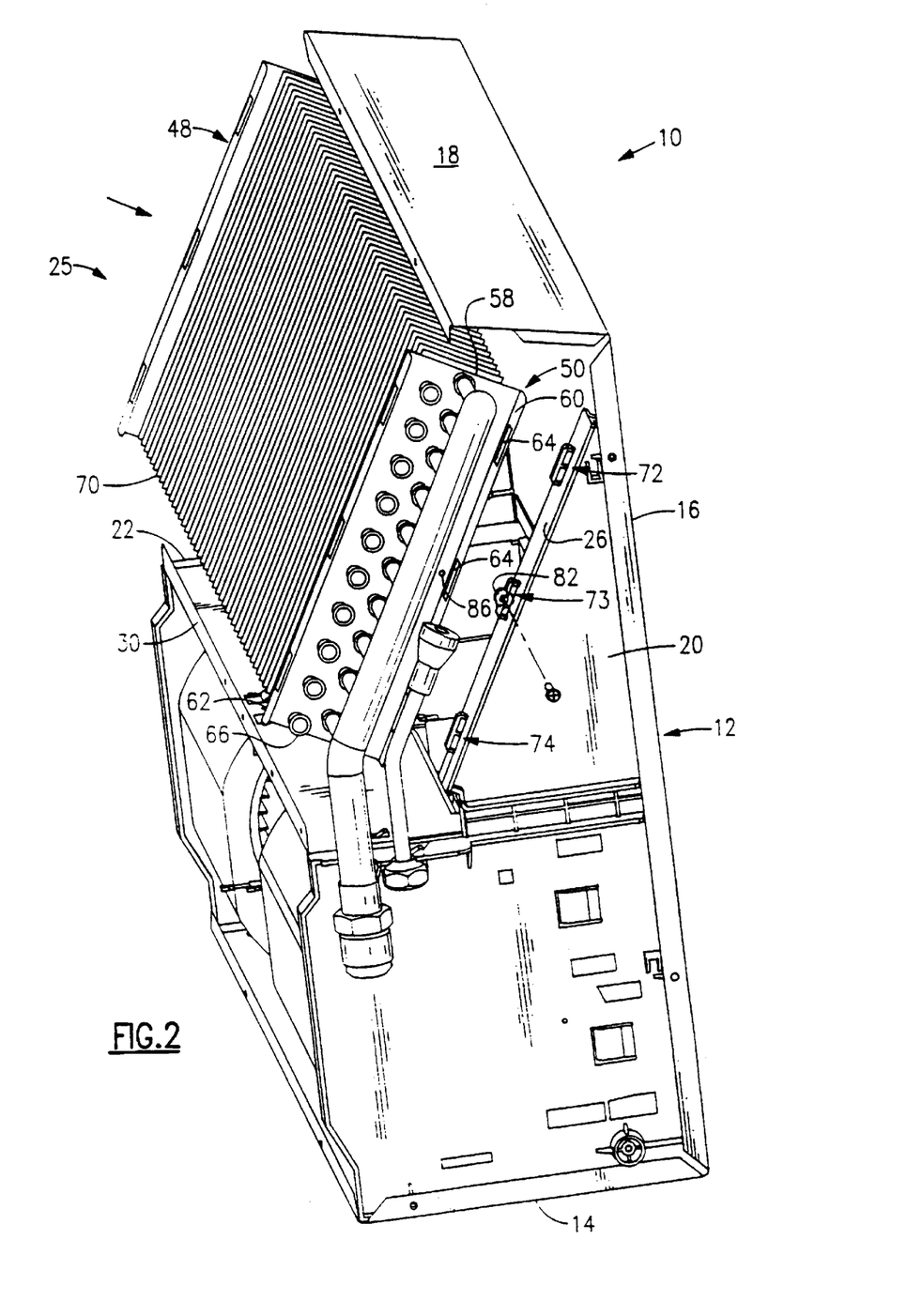
FIG. 2 is a right side perspective view of the air conditioner of FIG. 1 with the outer cover removed and the heat exchanger shown disassembled from the unit.
Figure 8:
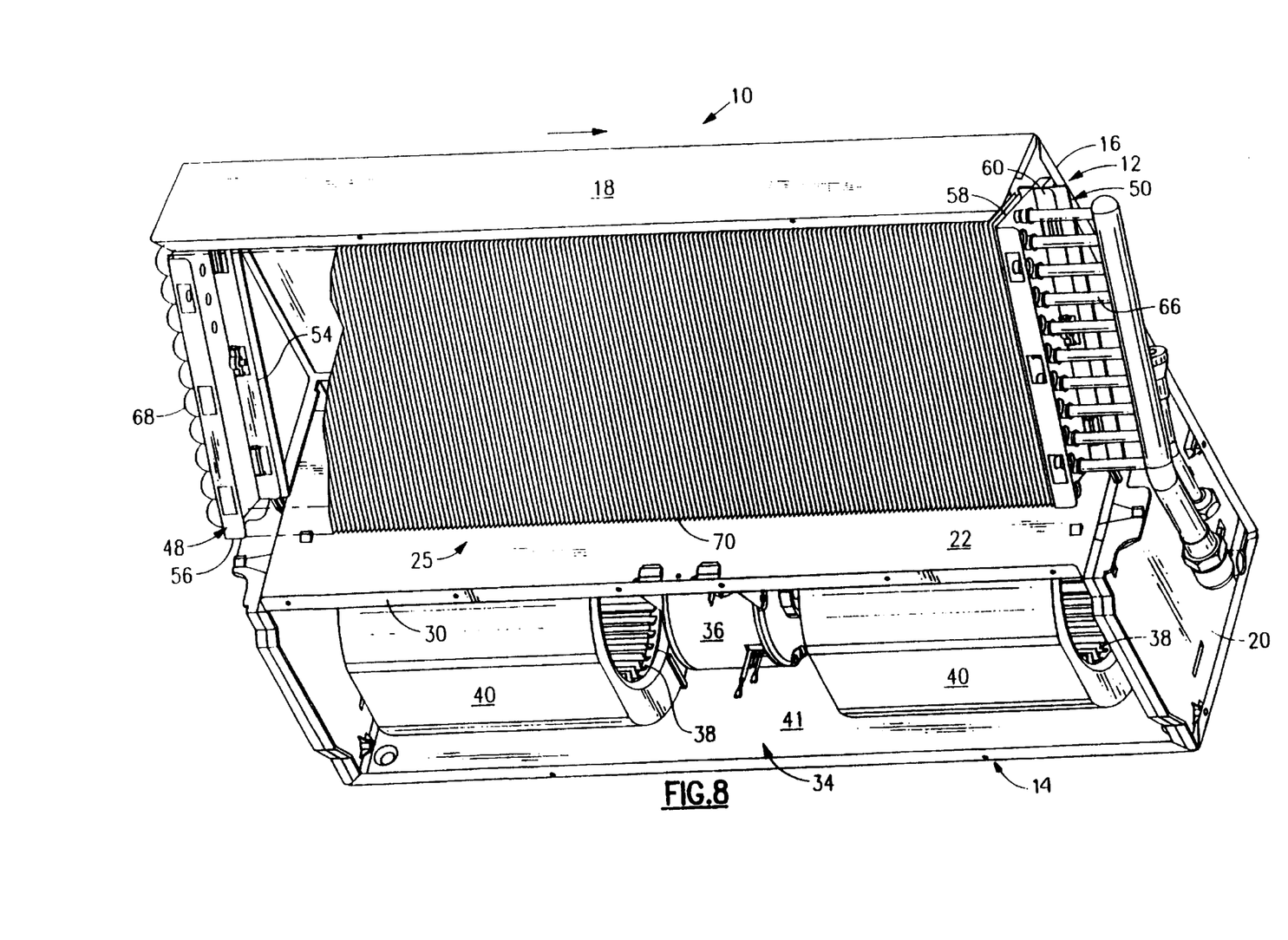
FIG. 8 is a front perspective view similar to FIG. 2 with the left-hand portion of a heat exchanger broken away.
Figure 9:
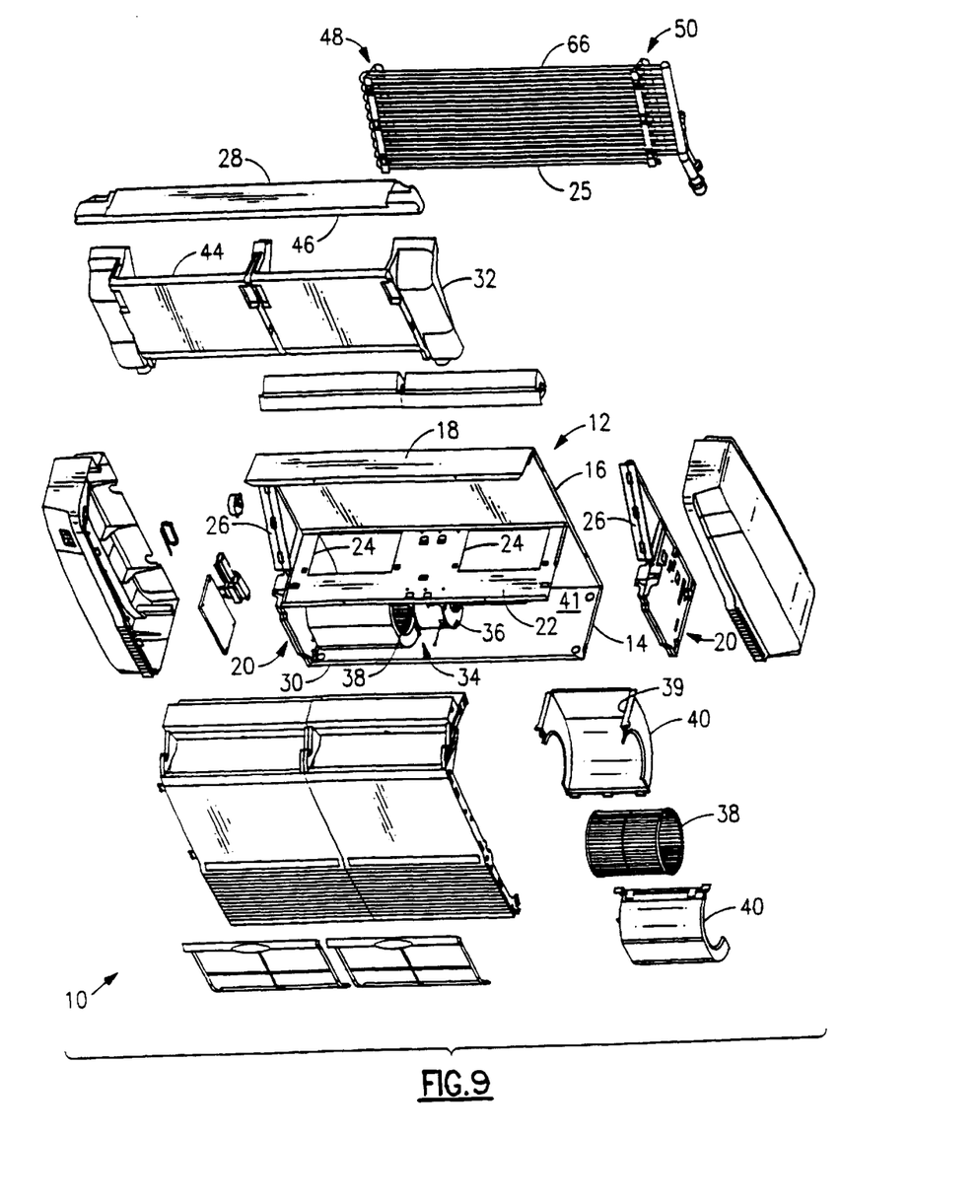
FIG. 9 is a perspective exploded view of the air conditioning unit of FIG. 1.

As best seen in FIG. 2, the previously described inclined surfaces 26 of the structural internal side covers 20 are positioned and configured such that they are spaced to receive the back flanges 54 and 60 of the tube sheets 48 and 50 in confronting supporting relationship therewith. Further, as best seen in FIG. 2, for the right-hand side cover and FIG. 8 for the left-and side cover, each of the inclined surfaces 26 is provided with an upper, center and lower 72, 73 and 74, respectively, upstanding structural protrusions. Each of these protrusions has an enlarged rectangularly shaped head section 75 configured to pass through the upper and lower rectangular openings 64 on the back flanges 54 and 60 of the tube sheets. Each of the protrusions 72, 73 and 74 is connected to its respective inclined surface 26 by a narrow root portion 76 to thereby define a narrow slot 78 between the lower surface of the enlarged head 75 and the inclined surface 26.

It will be noted that the center protrusions 73 are further provided with an integrally formed structural extension 80 on the upper side thereof. The upward extensions 80 are provided with an opening 82 therethrough, which extends substantially perpendicular to the planar center sections 52 and 58 of the tube sheets.

Figures 3, 4:
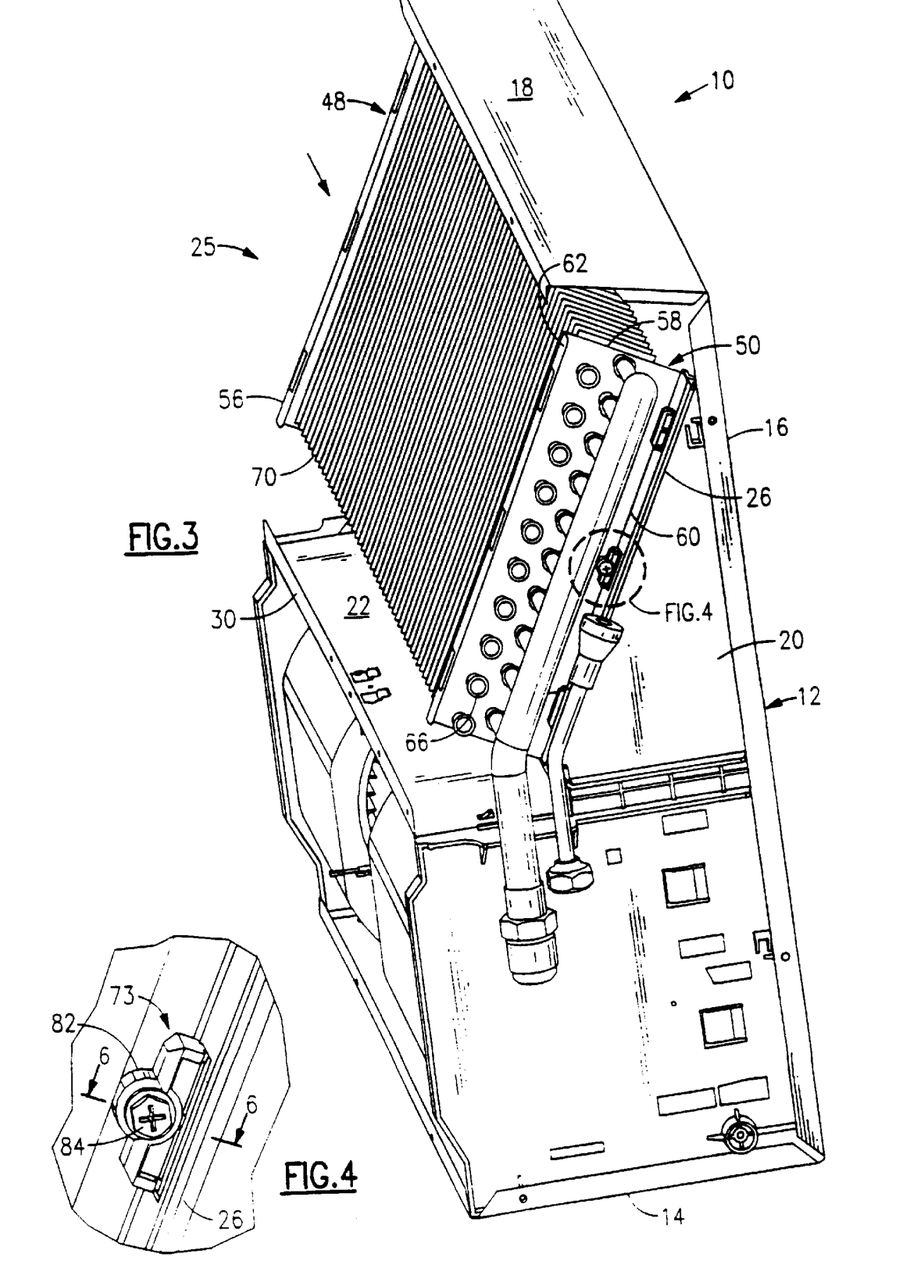
FIG. 3 is a view similar to FIG. 2 with the heat exchanger installed to the unit.
FIG. 4 is the detail identified as FIG. 4 in FIG. 3.

Installation of the heat exchanger 25 to the indoor unit 10 is accomplished by orienting the heat exchanger in confronting relation with the inclined surfaces 26, as illustrated in FIG. 2. The heat exchanger is manipulated such that the back flanges 54 and 60 of the tube sheets are in confronting relation with the inclined surfaces 26, with the upper, center and lower protrusions 72, 73 and 74 extending through the respective mating rectangular openings 54 provided in the back flanges 54 and 60. Following such alignment (which is illustrated schematically in FIG. 5, for the right-and tube sheet 50 and a center protrusion 73) the entire heat exchanger is manually displaced to the right as represented by the arrows in FIGS. 2, 3 and 6 to thereby result in a portion of the back flanges 54 and 60 adjacent the rectangular opening 64 to slide into the slots 78 defined by each of the upper center and lower protrusions. Such engagement is shown in detail in FIG. 6. Following such engagement, each of the tube sheets 48 and 50 is retained under the head section 75 of each of the upper center and lower protrusions.

Figure 5:
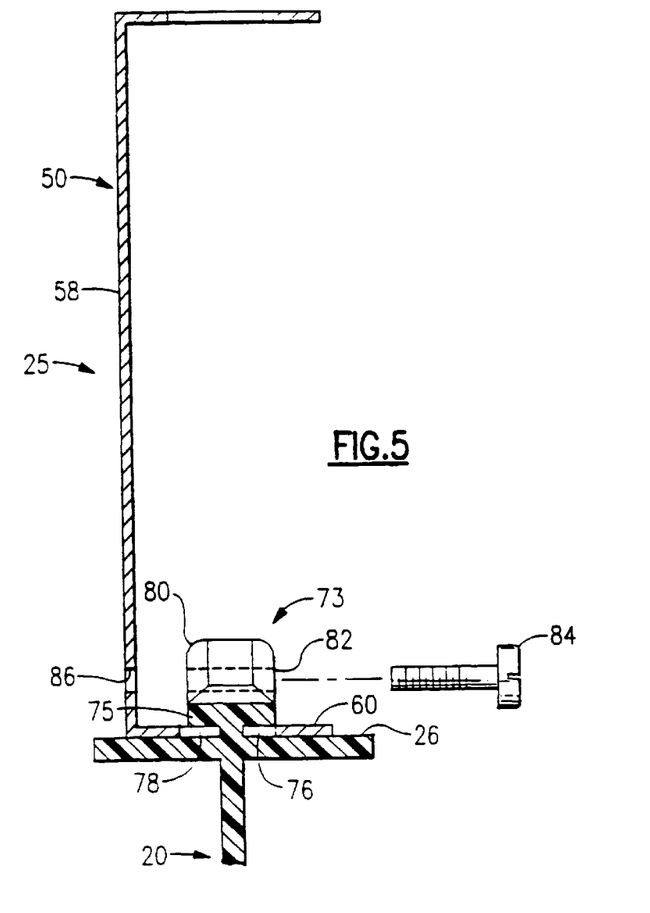
FIG. 5 is a simplified illustration of the details of the attachment of a heat exchanger.
Figure 6:
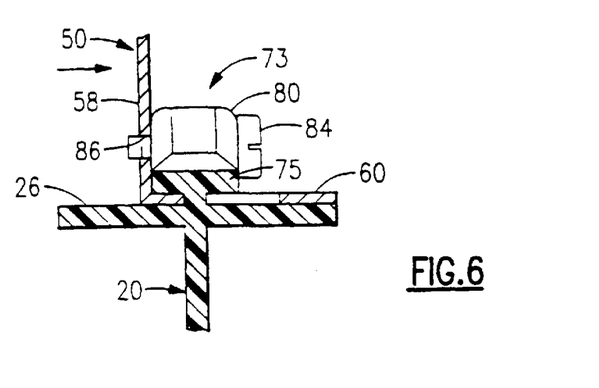
FIG. 6 is a view taken along the line 6—6 of FIG. 4.

As best shown in FIGS. 5 and 6, in order to assure retention of the heat exchanger in the above-described structural support relationship, a single self-tapping threaded fastener 84 is passed through the axial opening 82 in the structural extension of the center protrusion 73 adjacent to the planar center section 58 of the right-hand tube sheet. An appropriately sized opening 86 is provided in the center section of the tube sheet in axial alignment with the opening 82 such that the self-tapping screw 84 may be positively threaded into the hole in the tube sheet to thereby draw the tube sheet 50 and the entire heat exchanger 25 to the right and into a permanent positive structural support relationship, as described above.

As an optional additional attachment of the heat exchanger, as illustrated in FIG. 7, a second additional attachment screw 88 may be passed through a clearance opening 90 in the planar center section 52 of the left-hand tube sheet and threaded into an opening 94 in the structural extension of the center protrusion on the left-hand inclined surface, which opening is sized to be threadably engaged by the additional fastening screw 88.

What is claimed is:
1. A heat exchanger and support structure for the heat exchanger, said heat exchanger comprising:
   a first tube sheet having a first substantially planar mounting flange, said flange having at least one opening formed therein, said opening defining an edge facing in a predetermined direction;
   a second tube sheet having a second substantially planar mounting flange, said flange having at least one opening formed therein, said opening defining an edge facing in a predetermined direction, said second tube sheet being spaced from said first tube sheet, and said first and second planar mounting flanges being in substantially the same plane;
   said support structure comprising:
   a first substantially planar support surface adapted to receive said planar mounting flange of said first tube sheet in parallel confronting relationship therewith, said support surface having integrally formed therein an upstanding structural protrusion having a root section and an upper enlarged section, said enlarged section being configured to pass through said opening in said first flange, said root section and said enlarged section defining, together with said planar support surface, a narrow slot configured to receive said edge of said first tube sheet's mounting flange therein;
   a second substantially planar support surface adapted to receive said planar mounting flange of said second tube sheet in parallel confronting relationship therewith, said support surface having integrally formed therewith an upstanding structural protrusion having a root section and an upper enlarged section, said enlarged section being configured to pass through said opening in said second flange, said root section and said enlarged section defining, together with said planar support surface, a narrow slot configured to receive said edge of said second tube sheet's mounting flange therein;

said first tube sheet having a structural portion extending substantially perpendicularly from said mounting flange, said perpendicular structural portion being spaced from said edge and having an opening formed therein;

said upper enlarged section of said structural protrusion of said first support surface having a portion thereof in spaced relation with said perpendicular section of said first tube sheet, said portion having an opening therein in axial alignment with said opening in said perpendicular section;

a threaded fastener configured to pass through said opening in said portion and into threaded engagement with said opening in said perpendicular section;

whereby when said first and second tube sheets are positioned with said edge in confronting relation with said mating slots, and said threaded fastener is actuated to engage said perpendicular section, said edges are drawn into engagement with said slots to thereby attach said heat exchanger to said first and second support surfaces.

2. The apparatus of claim 1 wherein each of said first flange and said second flange have a plurality of openings formed therein and, wherein each of said first support surface and said second support surface have upstanding structural protrusions formed thereon at locations to cooperate with each of said openings in their respective mating flanges.

3. The apparatus of claim 2 wherein only one of said upstanding structural protrusions has said portion thereof in spaced relation with said perpendicular section of said first tube with said opening therein.

4. The apparatus of claim 2 wherein one of said upstanding structural protrusions of said first planar support surface and one of said upstanding structural protrusions of said second planar support surface have said portions thereof in spaced relation with said perpendicular section of said first and second tube sheets, respectively, with said openings therein.

\* \* \* \* \*